US010027836B2

(12) United States Patent
Ono

(10) Patent No.: US 10,027,836 B2
(45) Date of Patent: Jul. 17, 2018

(54) DISPLAY APPARATUS FOR DISPLAYING SHIFT STATE OF POWER SAVING MODE, DISPLAY METHOD AND STORAGE MEDIUM

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Shinji Ono, Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/992,165

(22) Filed: Jan. 11, 2016

(65) Prior Publication Data
US 2017/0201640 A1 Jul. 13, 2017

(51) Int. Cl.
H04N 1/00 (2006.01)

(52) U.S. Cl.
CPC ..... *H04N 1/00891* (2013.01); *H04N 1/00015* (2013.01); *H04N 1/00037* (2013.01); *H04N 1/00204* (2013.01); *H04N 2201/0094* (2013.01)

(58) Field of Classification Search
CPC ........... H04N 1/00891; H04N 1/00204; H04N 1/00037; H04N 1/00015; H04N 2201/0094
See application file for complete search history.

(56) References Cited

U.S. PATENT DOCUMENTS

| 8,145,931 B2* | 3/2012 | Vojak | G06F 1/3203 713/320 |
|---|---|---|---|
| 2002/0048039 A1* | 4/2002 | Nishikawa | G06K 15/00 358/1.15 |
| 2006/0053315 A1* | 3/2006 | Menzl | G06F 1/3203 713/300 |
| 2007/0212092 A1* | 9/2007 | Tsujimura | G03G 15/205 399/69 |
| 2009/0276650 A1* | 11/2009 | Kuroda | G03G 15/5004 713/320 |
| 2010/0156908 A1* | 6/2010 | Honda | G06F 1/3203 345/440 |
| 2010/0241888 A1* | 9/2010 | Kaneko | G06F 1/3203 713/324 |
| 2010/0275047 A1* | 10/2010 | Kaneko | G06F 1/3203 713/323 |

(Continued)

FOREIGN PATENT DOCUMENTS

JP 2009-282816 12/2009

Primary Examiner — Ted Barnes
(74) Attorney, Agent, or Firm — Amin, Turocy & Watson LLP

(57) ABSTRACT

A display apparatus comprises a control section and a display section. The control section is capable of switching a mode to each mode of a normal mode and a power saving mode that consumes less power than the normal mode, shifting an apparatus from the normal mode to the power saving mode in a case in which a shift period during which an operation or a job is not executed lasts a certain time, and totalizes times the apparatus enters the shift period, times the apparatus shifts to the power saving mode and dwell time when the apparatus is in the normal mode for each time zone. The display section displays each value totalized by the control section for each time zone.

10 Claims, 8 Drawing Sheets

(56) References Cited

U.S. PATENT DOCUMENTS

| | | | | |
|---|---|---|---|---|
| 2011/0239023 A1* | 9/2011 | Koga | ................ | G06K 15/4055 713/323 |
| 2012/0011385 A1* | 1/2012 | Sugiyama | .......... | G03G 15/5004 713/323 |
| 2012/0053868 A1* | 3/2012 | Matsumoto | ............... | G06F 1/28 702/61 |
| 2012/0166850 A1* | 6/2012 | Kuroda | ............. | G03G 15/5004 713/323 |
| 2012/0224206 A1* | 9/2012 | Takahashi | ............ | G06F 3/1229 358/1.13 |
| 2012/0300254 A1* | 11/2012 | Kato | .................... | G06F 3/1229 358/1.15 |
| 2013/0083346 A1* | 4/2013 | Fujiki | ................ | G03G 15/5004 358/1.13 |
| 2013/0094876 A1* | 4/2013 | Okunishi | ........... | G03G 15/5004 399/88 |
| 2013/0135659 A1* | 5/2013 | Ebi | ....................... | G06K 15/02 358/1.14 |
| 2014/0054963 A1* | 2/2014 | Spitchka | ............... | G01D 4/002 307/40 |
| 2014/0063527 A1* | 3/2014 | Takagi | .............. | H04N 1/00344 358/1.13 |
| 2014/0198333 A1* | 7/2014 | Won | .................. | H04N 1/00896 358/1.13 |
| 2014/0355052 A1* | 12/2014 | Mikashima | ........ | H04N 1/00904 358/1.15 |
| 2015/0199000 A1* | 7/2015 | Kawaura | .............. | G06F 1/3284 358/1.13 |

* cited by examiner

DISPLAY APPARATUS FOR DISPLAYING SHIFT STATE OF POWER SAVING MODE, DISPLAY METHOD AND STORAGE MEDIUM

FIELD

Embodiments described herein relate generally to a technology to display a shift state of a power saving mode of an apparatus that can be switched from a normal mode to the power saving mode.

BACKGROUND

An apparatus such as an image forming apparatus, if not in operation during a certain period, shifts from a normal mode to a power saving mode so as to make power consumption reduced. The apparatus shifts to the power saving mode if a period (shift period) during which there is no input or operation from an operation section or there is no reception or execution of a job such as a print job passes a certain time. A user uses a default setting period as the shift period or sets the shift period by himself/herself.

In the conventional apparatus, the user cannot grasp times indicating how much times the apparatus shifts to the power saving mode actually. Further, in the conventional apparatus, the user cannot grasp whether or not the set shift period is optimum.

DETAILED DESCRIPTION

Figure 1:
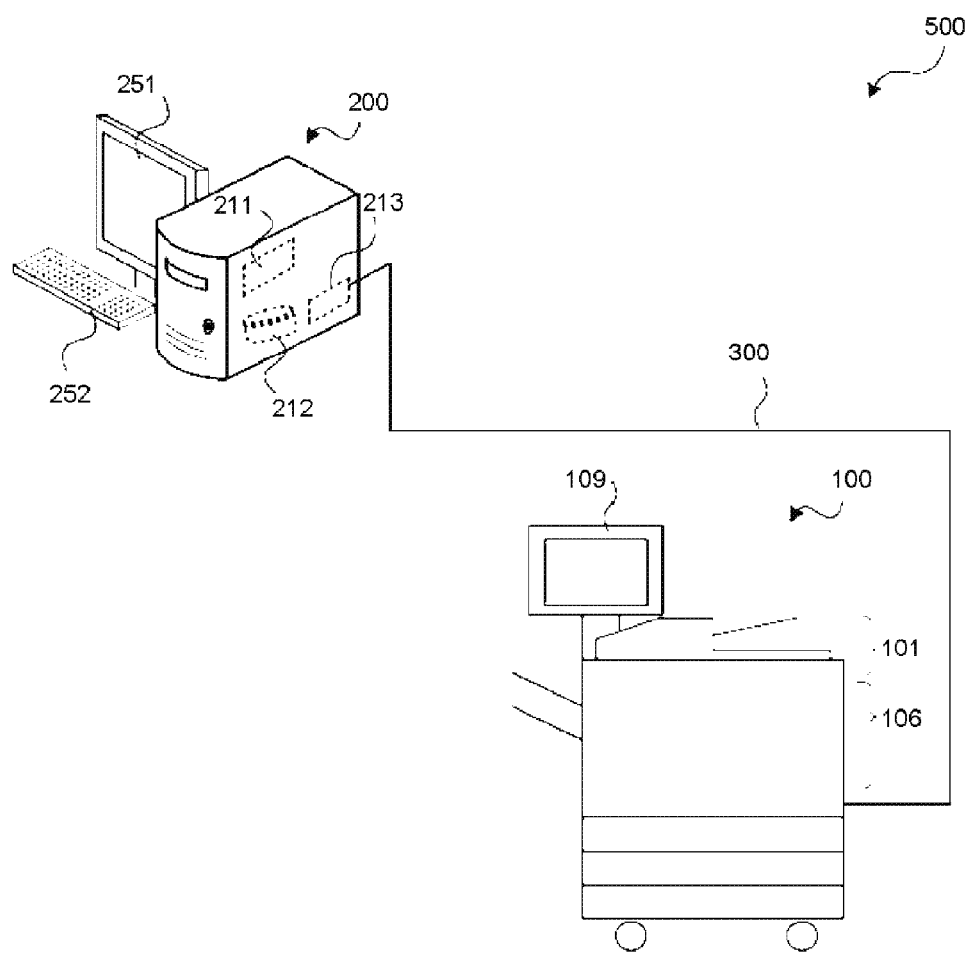
FIG. 1 is a schematic diagram of a system that comprises an image forming apparatus and a computer according to an embodiment.

A display apparatus of an embodiment comprises a control section and a display section. The control section is capable of switching a mode to each mode of a normal mode and a power saving mode that consumes less power than the normal mode, shifting an apparatus from the normal mode to the power saving mode in a case in which a shift period during which an operation or a job is not executed lasts a certain time, and totalizes times the apparatus enters the shift period, times the apparatus shifts to the power saving mode and dwell time when the apparatus is in the normal mode for each time zone. The display section displays each value totalized by the control section for each time zone.

An image forming apparatus of the embodiment collects and accumulates data indicating times of occurrence of opportunities indicating that the image forming apparatus will actually shift to the power saving mode and times of occurrence of opportunities indicating that the image forming apparatus can actually shift to the power saving mode within the shift opportunities for each time zone. The image forming apparatus of the embodiment graphs these kinds of information and displays graphed information in order to enable a user to grasp. Further, the image forming apparatus of the embodiment shifts to the power saving mode in a case in which no input or operation of the user from an operation section or no job such as printing is carried out during a certain time. The certain time is referred to as a shift period or a shift preparation as needed. The image forming apparatus of the embodiment displays the shift period as a recommended value. The user refers to these displays to set a shift period.

The shift period, in the present embodiment, is assumed as, for example, 10 minutes by default, and in a case in which there is no instruction of operation or printing from the user in 10 minutes from point in time the former operation or printing is terminated, the image forming apparatus shifts to the power saving mode. Furthermore, the user can adjust the shift period to seek power saving through the adjustment.

The shift period may be divided into a plurality of stages. In the present embodiment, as an example, an example of dividing the shift period into two stages consisting of a first shift period and a second shift period is described. In this case, the first shift period is assumed as 9 minutes by default and the second shift period is assumed as 1 minute by default. That is, the shift period becomes 10 minutes (9 minutes+1 minute) by default, and in a case in which there is no input or operation of the user from the operation section or no execution of a job such as a printing job in 10 minutes, the image forming apparatus shifts from the normal mode to the power saving mode. The user can adjust the shift period consisting of the first shift period and the second shift period to seek the power saving through the adjustment.

Hereinafter, the embodiment of the present invention is described with reference to the accompanying drawings.

FIG. 1 is a diagram exemplifying the structure a system according to the present embodiment. A system 500 includes a MFP 100 (MFP: Multifunction Peripheral) serving as an image forming apparatus and a PC 200 serving as a personal computer. Data transmission/reception is carried out between the MFP 100 and the PC 200 through a network 300.

The PC 200 includes a display section 251 serving as a monitor and an operation unit 252 such as a keyboard or a mouse (not shown). The PC 200 which is a personal computer previously includes a processor 211 serving as a CPU (Central Processing Unit) and a storage section 212 such as a memory or HDD that stores data in a volatile or non-volatile manner. Further, the PC 200 includes a network IF 213 (IF: Interface) that connects with the network 300 through an LAN (Local area network).

The MFP 100 is a multifunction peripheral that at least includes a copy function, a print function and a scan function. The MFP 100 includes a scan unit 101 that reads a document sheet and a printer unit 106 that forms an image on the sheet. The MFP 100 further includes a control panel 109 that contains a touch panel for receiving an operation from the user and a liquid crystal screen for display.

Figure 2:
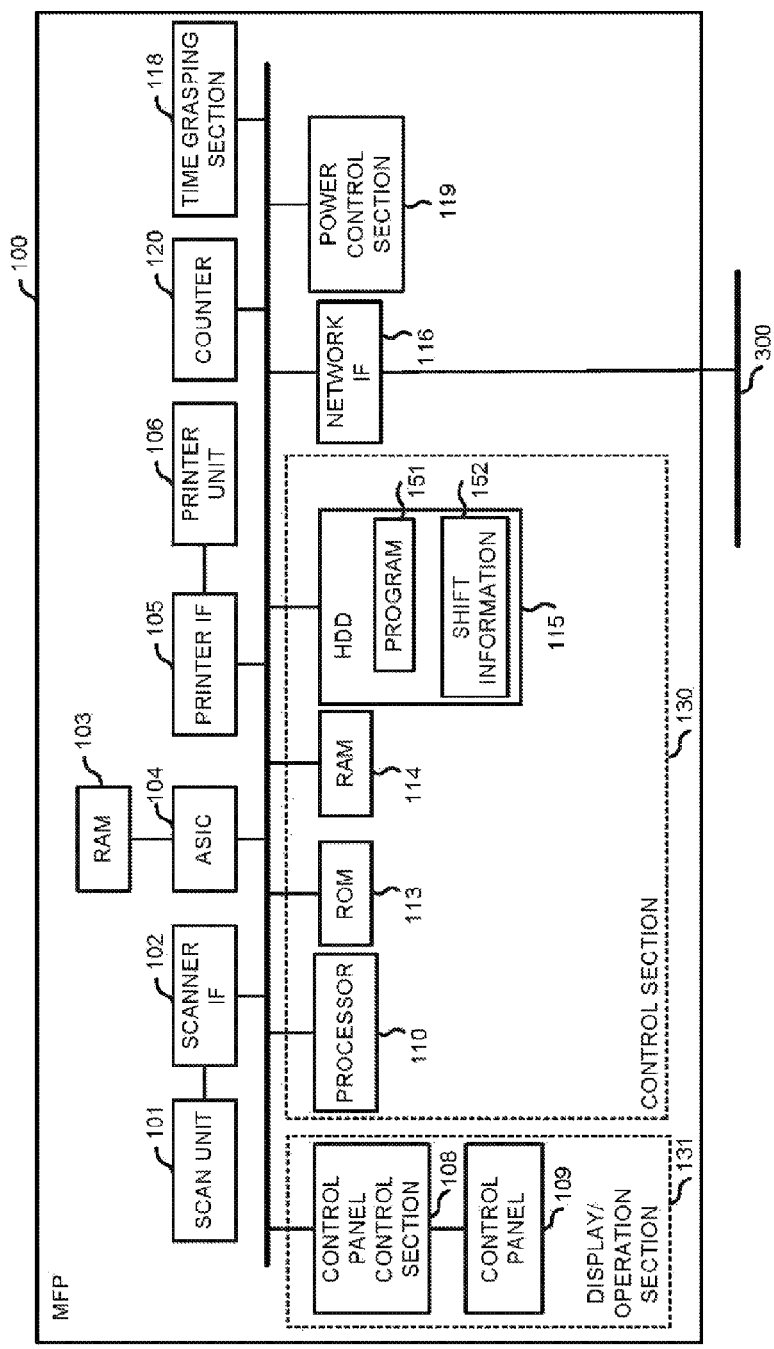
FIG. 2 is block diagram exemplifying the structure of the image forming apparatus according to the embodiment.

FIG. 2 is block diagram exemplifying the internal structure of the MFP 100.

The MFP 100 includes the scan unit 101 and a scanner IF 102 that controls communication between the scan unit 101 and each hardware. The MFP 100 includes a RAM 103 that copies or decompresses a read image and image data for printing sent from the PC 200 temporarily. The MFP 100 includes an ASIC (Application specific integrated circuit) 104 that performs various image processing on the image stored in the RAM 103. The MFP 100 includes the printer unit 106 and a printer IF 105 that controls communication between the printer unit 106 and each hardware.

The MFP 100 includes the control panel 109 and a control panel control section 108 for carrying out the display control of the control panel 109. Further, the MFP 100 includes a processor 110 serving as a central processing unit, a ROM 113 that stores a system program in a non-volatile manner and a RAM (Random Access Memory) 114 serving as a non-volatile main storage device.

The MFP 100 includes an HDD (Hard Disk Drive) 115. The HDD 115 stores data and a read image, information relating to the user and set parameters in a non-volatile manner. The HDD 115 stores a program 151 for executing various operations described later and shift information 152. The shift information 152 is data in which time information when the MFP 100 shifts to each mode of normal mode and power saving mode and shift times are accumulated. Further, in the shift information 152, time when the MFP 100 enters the shift period and times the MFP 100 enters the shift period are also accumulated.

A network IF 116 is connected with the network 300 and is a unit for controlling the communication with an external device. The power control section 119 is a unit for supplying power supplied from commercial power supply to an internal unit. The power control section 119, if in a power saving mode, carries out a control to suppress power supply of a designated unit or carries out a control to suppress power supply of a unit other than the designated unit. Further, the power control section 119, if returning from the power saving mode to the normal mode, increases power supply to the unit of which the power supply is suppressed and also charges the unit other than the designated unit. The power control section 119, for example, carries out a switch control of the power supply according to a control signal from the processor 110.

The MFP 100 includes a counter 120 and a time grasping section 118 that may be formed on separate boards respectively or on one board together with an ASIC. Each unit of the counter 120 and the time grasping section 118 may be realized by the execution of programs pre-stored in the ROM 113 and the HDD 115 by the processor 110.

The counter 120 counts each value of times the MFP 100 shifts to the power saving mode, times the MFP 100 enters the shift period and times the MFP 100 returns from the power saving mode to the normal mode. The counter 120 individually counts the three values.

The time grasping section 118 is a unit for counting date and time.

The processor 110 executes the program 151 to store information obtained from the counter 120 and the time grasping section 118 in the HDD 115. The stored information is the shift information 152. The processor 110 makes the time when the MFP 100 shifts to each mode and the shift times of each mode stored in an associated manner such that the shift times can be totalized for each time zone.

Further, in FIG. 2, a structure containing the processor 110, the ROM 113, the RAM 114 and the HDD 115 is regarded as a control section 130. Further, a structure containing the control panel control section 108 and the control panel 109 is regarded as a display/operation section 131.

Figure 3A:
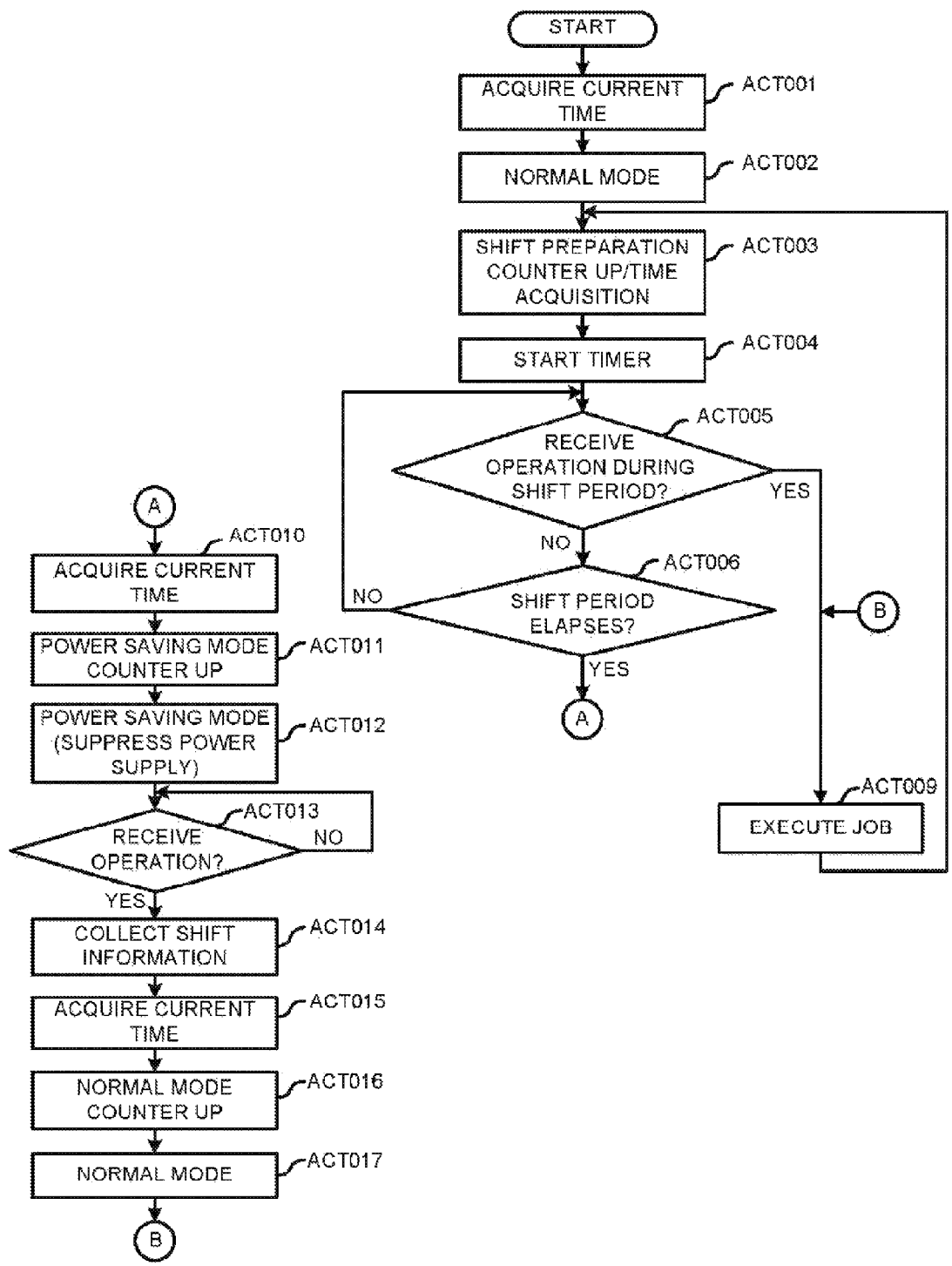
FIG. 3A is a flowchart illustrating an example of operations of shifting to each mode of normal mode and power saving mode of the image forming apparatus according to the embodiment.
Figure 3B:
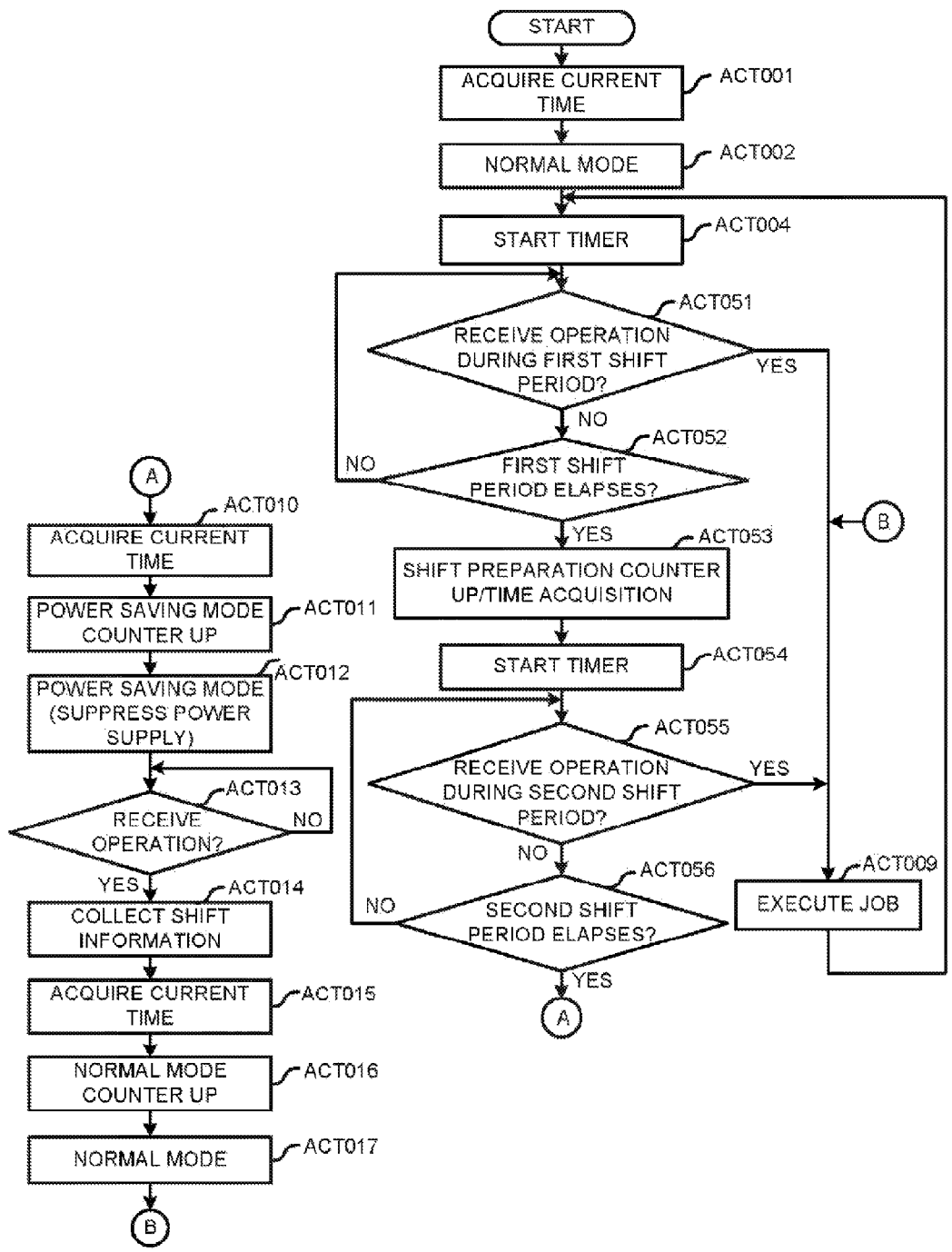
FIG. 3B is a flowchart exemplifying the operations of shifting to each mode of normal mode and power saving mode of the image forming apparatus and a diagram exemplifying the operations of dividing shift time into two stages according to the embodiment.

In FIG. 3A and FIG. 3B, an example of a shift operation of the normal mode and power saving mode of the MFP 100 is illustrated. FIG. 3A exemplifies the operations in a case in which the shift period is not divided, and FIG. 3B exemplifies the operations in a case in which the shift period is divided into two stages containing a first shift period and a second shift period. The operations shown in FIG. 3A and FIG. 3B are carried out in such a manner that the processor 110 of the MFP 100 copies or decompresses the program 151 in the RAM 114 to execute it. Further, an ASIC circuit dedicated to executing the operations shown in FIG. 3A and FIG. 3B is created and thus the ASIC circuit may execute the operations shown in FIG. 3A and FIG. 3B. The power control section 119, the time grasping section 118 and the counter 120 may operate on their own. Furthermore, flow-charts shown in FIG. 3A and FIG. 3B end with an interrupt operation such as power off occurring.

First, the example of the operations in a case of not dividing the shift period is described with reference to FIG. 3A. If power source of the MFP 100 is on, an initialization operation is carried out. Afterwards, the processor 110 acquires current time from the time grasping section 118 and stores it in the RAM 114 (ACT 001). The processor 110 instructs the power control section 119 to enable the MFP 100 to operate in the normal mode (ACT 002). The power control section 119 receives this instruction signal to supply power to each unit.

In a case in which the MFP 100 is in the normal mode, for example, there is no print instruction from the PC 200 or there is no operation of the display/operation section 131 and no job is executed, the MFP 100 enters the shift period in the present example. Furthermore, it may be applicable that waiting time of a few minutes is arranged prior to entering the shift period and later the MFP 100 enters the shift period after the pre-defined waiting time of a few minutes elapses without intermediately entering the shift period even in the normal mode. That is, after the processing in ACT 002 is executed, a processing in ACT 003 may be executed after the waiting time elapses.

The processor 110 enables a shift preparation counter (the times the MFP 100 enters the shift period) of the counter 120 to be increased by "1" (ACT 003). In the present example, the MFP 100 enters the shift period from the processing in ACT 003. Further, when the processing in ACT 003 is carried out, the processor 110 acquires the current time from the time grasping section 118 for time zone totalization and makes the value and time of the shift preparation counter stored in the RAM 114 in an associated manner.

The processor 110 clears a timer for counting the shift period (by default, 10 minutes) to "0" to start the counting of the time (ACT 004).

The processor 110 determines whether or not there is, for example, a print instruction from the PC 200 and an operation of the display/operation section 131 during the shift period (ACT 005). During the shift period, in a case in which there is no print instruction and operation (No in ACT 005 and Yes in ACT 006), the processing proceeds to ACT 010. On the other hand, during the shift period, in a case in which there is the print instruction or an operation (loop of No in ACT 006 and Yes in ACT 005), the processor 110 stops the counting of the timer to execute an image processing and printing of the job (ACT 009). After the image processing and the printing of the job are completed, the processor 110 returns to the processing in ACT 003. Furthermore, when returning to the processing in ACT 003 from the processing in ACT 009, similar to the operations in ACT 002~ACT 003, the processor 110 may return to the processing in ACT 003 after the waiting period of a few minutes elapses. If returning to the processing in ACT 003, the processor 110 enables the shift preparation counter to increase '1", acquires the current time, and makes the counter value and the current time stored in the RAM 114 in an associated manner, and later clears the timer to "0' again to recount the shift period (ACT 004).

During the shift period, in a case in which there is no print instruction and operation (Yes in ACT 006), the processor 110 stops the counting of the timer to acquire the current time from the time grasping section 118 (ACT 010). The processor 110 enables a power saving mode counter (times the MFP 100 shifts to the power saving mode) to increase by "1" (ACT 011) and makes the current time and the value of the power saving mode counter stored in the RAM 114 in an associated manner. The processor 110 instructs the power control section 119 to enable the MFP 100 to operate in the power saving mode (ACT 012). The power control section 119 receives this instruction signal to lower power supply amount for each unit or stop the power supply. From here, the mode of the MFP 100 becomes the power saving mode.

At the time of the power saving mode, the processor 110 determines whether or not there is, for example, a print instruction from the PC 200 and an operation of the display/operation section 131 (ACT 013). The processor 110 maintains the power saving mode until these print instruction and the operation are executed (loop of No in ACT 013).

If there is the print instruction and the operation (Yes in ACT 013), the processor 110 collects time data and the counter value that has been acquired so far and writes them into the HDD 115 as the shift information 152 (ACT 014). The processor 110 acquires the current time from the time grasping section 118 (ACT 015) and enables a normal mode counter (the times the MFP 100 returns to the normal mode) of the counter 120 to increase by "1" (ACT 016) and makes the current time and the value of the normal mode counter stored in the RAM 114 in an associated manner. Then, the processor 110 instructs the power control section 119 to enable the MFP 100 to operate in the normal mode (ACT 017). The power control section 119 receives this instruction signal to increase power supply amount for each unit, or to start power supply. Then, the processor 110 proceeds to the processing in ACT 009 to execute a job according to the print instruction and the operation in ACT 013 and complete the job (ACT 009).

Through each operation shown in FIG. 3A, the following information is stored in the shift information 152.
  times the MFP 100 enters the shift period through the processing in ACT 003.
  times the MFP 100 shifts from the normal mode to the power saving mode through the processing in ACT 011.
  times the MFP 100 returns to the normal mode through the processing in ACT 016.
  dwell time in the power saving mode according to the difference between time obtained by the processing in ACT 010 and ACT 015.
  dwell time in the normal mode according to the difference between time obtained with the processing in ACT 003 and ACT 010 (until the MFP shifts to the power saving mode after powered on).
  dwell time in the normal mode according to the difference between time obtained with the processing in ACT 015 and ACT 010 (loop back) (until the MFP returns to the normal mode from the power saving mode and again shifts to the power saving mode).

Furthermore, during the shift period, the power control section 119 may control the supply of power to make supply power smaller than or equal to that in job execution of which supply power is larger than that in the power saving mode. Under such a control, if a job is received during the shift period, it is quick to return from the power saving mode, and the job can be executed.

Next, with reference to FIG. 3B, an example of the operations in a case of dividing the shift period into two stages including the first shift period and the second shift period is described. The first shift period is assumed as 9 minutes by default as stated above, and the second shift period is assumed as 1 minute by default.

The processing in ACT 001 and ACT 002 in FIG. 3B is the same as that in FIG. 3A. In the example of FIG. 3B, after the mode of the MFP 100 becomes the normal mode through the processing in ACT 002, the processor 110 clears a timer for counting the first shift period to "0" and starts to count the time (ACT 004).

The processor 110 determines whether or not there is, for example, a print instruction from the PC 200 or an operation of the display/operation section 131 during the first shift period (ACT 051). During the first shift period, in a case in which there is no print instruction and operation (No in ACT 051 and Yes in ACT 052), the processor 110 enables a shift preparation counter (times the MFP 100 enters the shift period) of the counter 120 to increase by "1" (ACT 053). The processor 110 acquires the current time from the time grasping section 118 for time zone totalization and makes the value of the shift preparation counter and the current time stored in the RAM 114 in an associated manner (ACT 053). The processor 110 clears the timer to "0" and recounts time for the second shift period (ACT 054).

The processor 110 proceeds to a processing in ACT 010 in a case in which there is no print instruction or operation during the second shift period (No in ACT 055 and Yes in ACT 056).

In a case in which there is a print instruction or an operation during the first shift period and the second shift period (Yes in ACT 051 and Yes in ACT 055), the processor 110 stops the counting of the timer and executes an image processing and printing of the job (ACT 009). After the image processing and the printing of the job are completed, the processor 110 returns to the processing in ACT 004, clears the timer to "0" and recounts time for the first shift period (ACT 004).

The description of the operations after the processing in ACT 010 is the same as that in FIG. 3A and thus is omitted. Further, in the example of FIG. 3B, the shift preparation count is up after the elapse of the first shift period. That is, the second shift period functions as a net shift period. On the contrary, as shown in FIG. 3A, it may be applicable that between the processing in ACT 002 and ACT 004, by carrying out shift preparation counter up and time acquisition, a period obtained by joining the first shift period and the second shift period is assumed as a shift period.

Furthermore, in the foregoing form of FIG. 3B, the power control section 119 may control the supply of power to make the power supply during the first shift period smaller than or equal to that in job execution of which power supply is larger than that in the power saving mode. Further, the power control section 119 may control the supply of power to make the power supply during the second shift period smaller than or equal to that during the first shift period of which the power supply is larger than that in the power saving mode. As an example of the form, during the first shift period, for example, the screen of the control panel 109 is extinguished (turned off), or power supply of a fixing device may be suppressed to reduce calorific value. In the second shift period, for example, power supply of the fixing device is reduced to lower calorific value further than the first shift period, and thus power consumption may be suppressed. Further, in the second shift period, by making hard disk drive stop, power consumption may be suppressed further than the first shift period.

In this way, power control can be carried out minutely by dividing the shift period into many stages.

Figure 5:
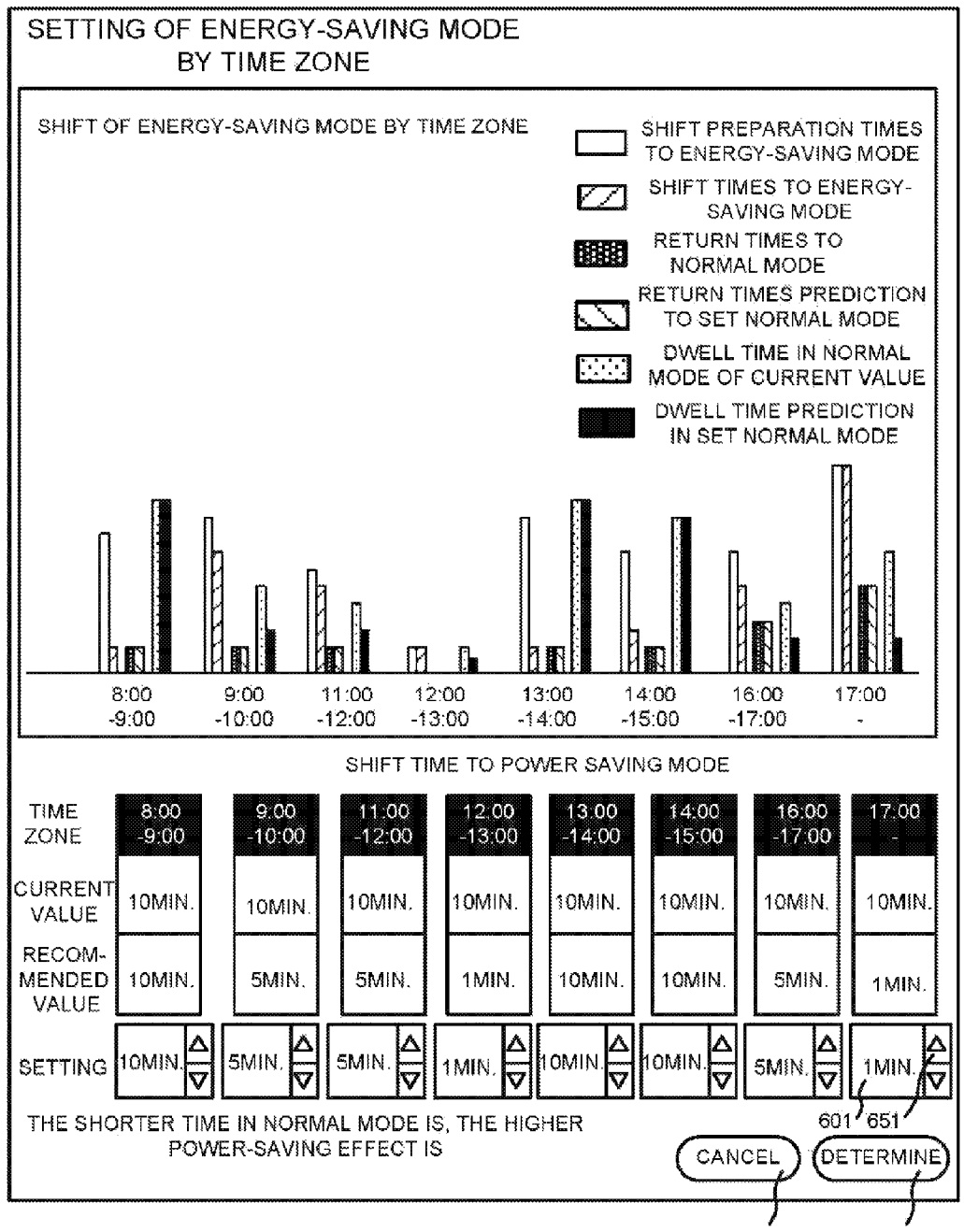
FIG. 5 is a diagram exemplifying a screen display of the image forming apparatus according to the embodiment (a setting mode)
Figure 6:
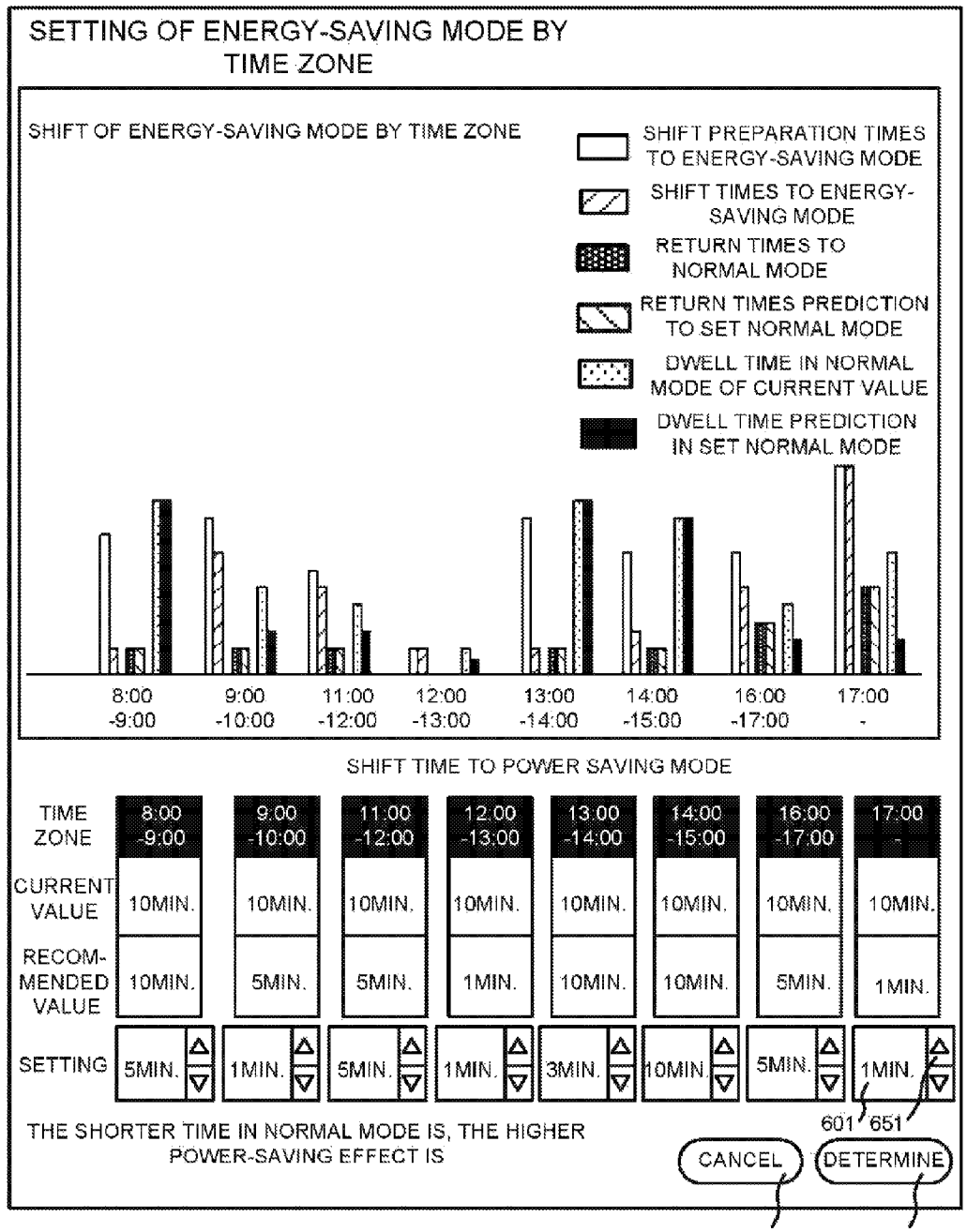
FIG. 6 is a diagram exemplifying a screen display at the time of the change of a shift period with respect to the screen in FIG. 5.

The MFP 100 graphically displays a shift state relating to power saving obtained in this way to the user. This screen image is shown in FIG. 4~FIG. 6.

Figure 4:
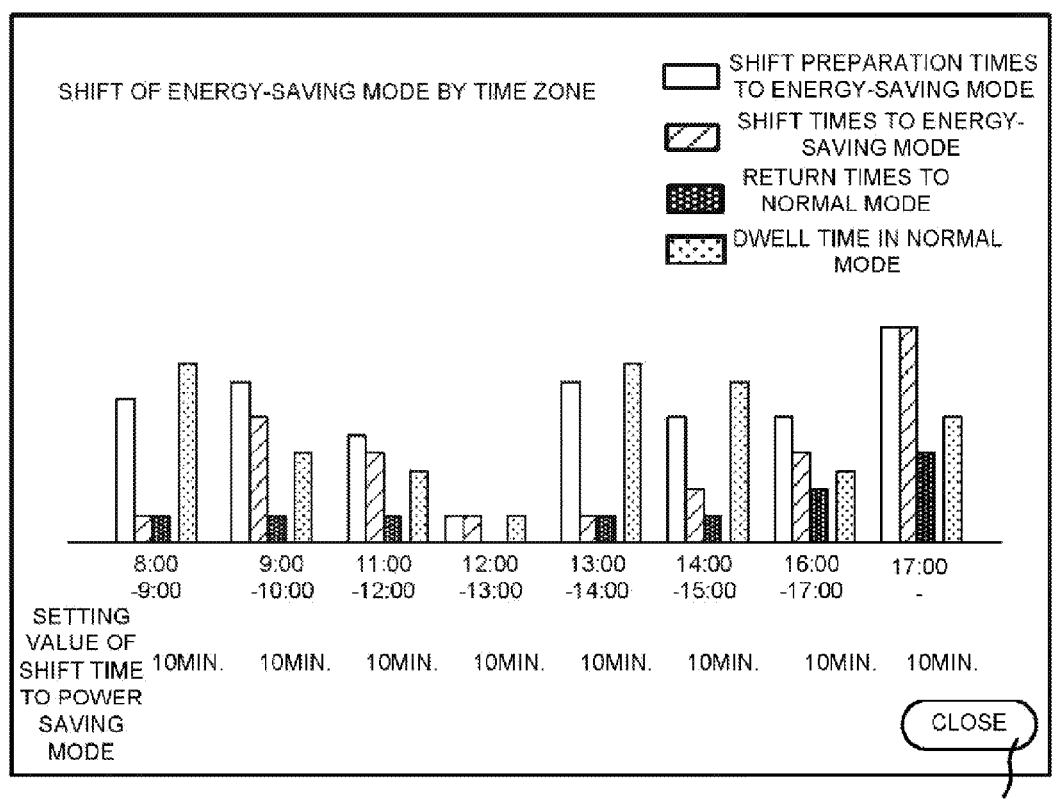
FIG. 4 is a diagram exemplifying a screen display of the image forming apparatus according to the embodiment (a simple display mode)

FIG. 4 is an example of a screen display of the simple display mode. The screen of the simple display mode shown in FIG. 4 is assumed to be displayed by the control panel 109 of the MFP 100; however, it may be displayed by the display section 251 of the PC 200 by carrying out data transmission/reception via the network 300. If a button 501 is pressed, the screen display is terminated.

As shown in FIG. 4, the control panel 109 displays that times the MFP 100 enters the shift period (energy-saving mode shift preparation times), times the MFP 100 shifts to the power saving mode (energy-saving mode shift times), normal mode return times and normal mode dwell time are divided for each time zone that takes one hour as a unit. Further, the control panel 109 displays the value of the shift period set currently for each time zone.

Through the example of FIG. 4, in each time zone of 8:00~9:00, 13:00~14:00 and 14:00~15:00, the times the MFP 100 shifts to the power saving mode is less than the times the MFP 100 enters the shift period. This shows that the MFP 100 tries to shift to the power saving mode, but cannot fully shift thereto, and thus it is understood that the use frequency of the MFP 100 is high. The user can speculate that it is difficult to realize power saving in these time zones.

On the other hand, except the foregoing time zones, a ratio of the times the MFP 100 shifts to the power saving mode is higher with respect to the times the MFP 100 enters the shift period. This shows that the ratio indicating that the MFP 100 actually shifts to the power saving mode is high, and thus it can be speculated that the use frequency of the user is low. The shorter the shift period of this time zone is, the less the dwell time in the normal mode can be.

In this way, in the present embodiment, the times the MFP 100 enters the shift period and the times the MFP 100 shifts to the power saving mode are displayed in graph form and displayed so that the user can confirm these differences (relation of each times) by sight. In addition to the display of the times in graph form, ratios of the times the MFP 100 enters the shift period and the times the MFP 100 shifts to the power saving mode or ratios of times the MFP 100 enters the shift period, the times the MFP 100 shifts to the power saving mode and the times the MFP 100 returns to the normal mode may be displayed with, for example, numerical values or a circular chart.

FIG. 5 shows an example of a display screen of a setting mode. The screen shown in FIG. 5 is a screen for changing the value of the shift period actually. The screen of FIG. 5 may be displayed only for a user having specific authority such as a maintenance person or manager. Further, as similar to the simple display mode, the display section 251 of the PC 200 is displayed via the network 300 to receive change of setting.

The user can set the shift period of each time zone with the use of the screen. In a case of the setting mode shown in FIG. 5, the control panel 109 displays, in addition to each graph shown in FIG. 4, predicted times the MFP 100 returns to the set normal mode and dwell time prediction in the set normal mode that are graphed. Further, the control panel 109 also displays a recommended value for each time zone together with the shift period of the current state.

An up and down arrow button 651 and a display column 601 are interfaces used for setting a shift period the user desires. If the user operates the up and down arrow button 651, the numerical value of the display column 601 is changed. As the user changes the value of the display column 601, the control panel 109 also changes drawing of each graph of the predicted times the MFP 100 returns to the normal mode and the dwell time prediction of the normal mode by following the value.

FIG. 6 exemplifies the change of the shift periods of time zones of 8:00~9:00, 9:00~10:00 and 13:00~14:00 with respect to FIG. 5. If the shift period is reduced, the dwell time in the normal mode becomes short, but times prediction of the return is increased correspondingly. In this way, if the MFP 100 shifts to the power saving mode when used frequently, the power consumption can be reduced, but at the same time waiting time of the return is increased, and thus usability is worse. The user changes the setting value while taking that into consideration and changes the value to be suitable to application.

If a cancel button 611 shown in FIG. 5 and FIG. 6 is pressed, the operation so far by the user is canceled and the setting value of the current state is maintained. If a determination button 612 is pressed, the existing shift period is updated to a numerical value displayed on the display column 601, and then the MFP 100 operates according to the shift period designated by the user. Further, if the determination button 612 is pressed, as the shift period is changed, it is impossible to apply a statistical value of the shift state so far. Thus, the processor 110 takes the shift information 152 as history information, reserves it in another file and meanwhile creates new shift information 152.

Furthermore, in a case of dividing the shift period into two stages consisting of the first shift period and the second shift period, for example, in a case of changing the shift period from 10 minutes by default to 5 minutes, the first shift period and second shift period both are changed and the total thereof may become 5 minutes. If only one of them (for example, only the first shift period) is changed and the other is unchanged, the total thereof may become 5 minutes.

Figure 7:
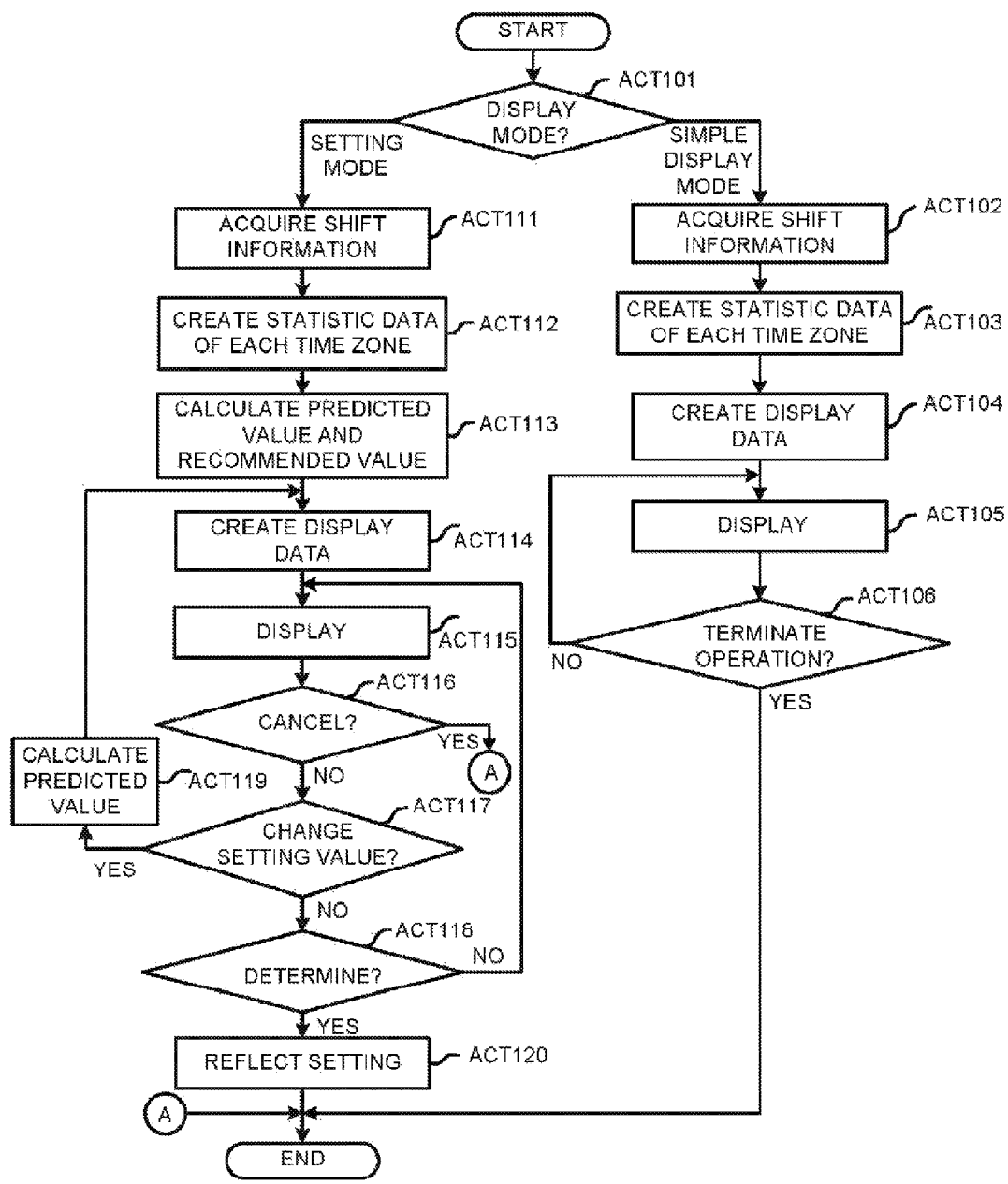
FIG. 7 is a flowchart illustrating an example of the display operations of the image forming apparatus according to the embodiment.

FIG. 7 is a flowchart exemplifying the operations of the MFP 100 at the time of the display of the screens shown in FIG. 4~FIG. 6. The operations shown in FIG. 7 are realized through the execution of the program 151 by the processor 110. Furthermore, the ASIC circuit dedicated to executing the operations shown in FIG. 7 is created to execute the operations shown in FIG. 7.

The processor 110 determines whether or not the user selects either of the simple display mode and the setting mode through a display mode selection screen (not shown) (ACT 101). In a case in which the simple display mode is displayed (simple display mode in ACT 101), the processor 110 acquires the shift information 152 stored in the HDD 115 (ACT 102) and creates statistic data of each time zone (ACT 103). The processor 110 totalizes each of times the MFP 100 enters the shift period, times the MFP 100 shifts to the power saving mode, times the MFP 100 returns to the normal mode and dwell time in the normal mode for each time zone. Further, the processor 110 calculates a daily average value by dividing each totalized value by the number of days from the measurement start date to the current day.

The processor 110 acquires a screen layout registered in the HDD 115 in advance, applies each numerical value calculated in ACT 103 to create graph data for display and text data for display (ACT 104) and displays the data on the control panel 109 (ACT 105). FIG. 4 is an example of the screen at this time. The processor 110 maintains the display until the display button 501 is pressed (loop of No in ACT 106), if the display button 501 is pressed (Yes in ACT 106), the operations are terminated.

In ACT 101, if the setting mode is selected (setting mode in ACT 101), the processor 110 acquires the shift information 152 stored in the HDD 115 (ACT 111) and creates statistic data of each time zone (ACT 112). The operation in ACT 112 is the same as that in ACT 103.

The processor 110 carries out a stipulated threshold value comparison to calculate a predicted value and a recommended value with the use of a stipulated conditional formula and numerical formula (ACT 113). It can be controlled that the longer the dwell time in the normal mode is, the greater the power consumption is and the shorter the dwell time in the normal mode is, the smaller the power consumption is, thereby improving power-saving effect. From this point, the processor 110 sets the value adjusted in such a manner that the dwell time in the normal mode is shortened to the recommended value. Further, the processor 110, according to the difference between times the MFP 100 enters the shift period and times the MFP 100 shifts to the power saving mode, determines whether a current value is set to the recommended value or a new recommended value is presented. For example, in a case in which the difference between times the MFP 100 enters the shift period and times the MFP 100 shifts to the power saving mode is greater than a stipulated value is equal to or greater than the stipulated value, as it means that the MFP 100 does not shift to the power saving mode actually, even if the shift period is changed, the effect of the shift is not admitted. Therefore, the processor 110 does not change the current value and sets it as the recommended value. On the other hand, in a case in which the difference between times the MFP 100 enters the shift period and times the MFP 100 shifts to the power saving mode is equal to or smaller than the stipulated value or smaller than the stipulated value, as there are many times the MFP 100 shifts to the power saving mode actually, the power-saving effect can also be expected through the change of the setting value. Therefore, the processor 110 calculates a new recommended value in this case.

According to a ratio of times the MFP 100 enters the shift period to times the MFP 100 shifts, to the power saving mode, the processor 110 may determine whether or not a new recommended value is calculated. If this ratio is assumed as (times the MFP 100 shifts to the power saving mode/times the MFP 100 enters the shift period), in a case in which the ratio is greater than (or equal to or greater than) the stipulated value, there are many times the MFP 100 shifts to the power saving mode, and thus the recommended value is calculated. In a case in which this ratio is equal to or smaller than (or smaller than) the stipulated value, there are few times the MFP 100 shifts to the power saving mode, and thus the current value is assumed as the recommended value.

In a case in which a new recommended value is calculated, the processor 110 carries out the threshold value comparison to calculate each predicted value (each of predicted times the MFP 100 returns to the normal mode and dwell predication time of the normal mode) in a case of firstly taking recommended value as 1 (minute) with the use of the stipulated conditional formula and numerical formula. The processor 110 stores each predicted value calculated herein in the RAM 114 in association with the recommended value "1 minute". Next, the processor 110 calculates each predicted value in a case of taking the recommended value as 2 (minutes) and stores each predicted value in association with the recommended value "2 minutes". The calculation is carried out until the recommended value becomes 60 "minutes". The processor 110 sets a recommended value within the calculated recommended values 1 (minute)~60 (minutes) during which the dwell predication time of the normal mode is shortest to a recommended value for display. The processor 110 carries the calculation for each time zone to calculate the recommended value of each time zone, dwell predication time of the normal mode and predicted times the MFP 100 returns to the normal mode.

Further, the following embodiment is also applicable to the derivation of the recommended value.

In a case of the example of not dividing the shift period shown in FIG. 3A, the processor 110 measures, stores and counts time from start to end of the timer and calculates an average value for each time zone. The average value is a measurement value of a period from the moment the job is executed to the moment a next job is executed. The processor 110 keeps a little margin in the average value and sets time longer than the average value as the recommended value. Further, in a case of dividing the shift period shown in FIG. 3B into two stages, the recommended value is derived easily by counting up the shift preparation counter upon entering the second shift period. That is, when the operation or job is executed during the first shift period, the reduction of shift preparation times and the recommended value can serve as a guide.

The processor 110 applies the statistic data and the calculated recommended value and each predicted value to create display data (ACT 114), and displays the screen exemplified in FIG. 5 on the control panel 109 (ACT 115).

The processor 110 determines whether or not the cancel button 611 is pressed (ACT 116). If the cancel button 611 is pressed (Yes in ACT 116), the processor 110 ends the processing in FIG. 7.

If the change of setting is received through the operation of the up and down arrow button 651 (Yes in ACT 117) without pressing the cancel button 611 (No in ACT 116), the processor 110 calculates predicted values (predicted times the MFP 100 returns to the normal mode and dwell predication time of the normal mode) with the changed setting value (ACT 119). This calculation method, as similar to that in ACT 113, carries out the threshold value comparison with the use of the stipulated conditional formula and numerical formula to calculate. The processor 110 recreates display data with the use of the predicted value (return to ACT 114).

If the operation of the change of the setting value is not carried out (No in ACT 117), in a case in which the determination button 612 is pressed (Yes in ACT 118), the processor 110 updates and reflects the current shift period with the setting value of each time zone displayed on the display column 601 (ACT 120). The processor 110 rewrites a value of a storage area where the shift period is stored with the changed value to update and reflect it. In this way, the processor 110 controls the power control section 119 to operate during the changed shift period.

Furthermore, in a case in which the determination button 612 is not pressed (No in ACT 118), the processor 110 returns to the processing in ACT 115. That is, in a case in which none of the cancel button 611, the up and down arrow button 651 and the determination button 612 is operated, the display content of the current state indicated by loop of ACT 115~ACT 118 is maintained.

The operations shown in FIG. 7 may be carried out by the PC 200. In this case, each unit of the network IF 213, the storage section 212, the operation unit 252 and the display section 251 operates to realize the operations according to the execution instruction of the processor 211.

In the present embodiment, it is described that functions for performing the foregoing embodiment are pre-stored inside an apparatus; however, the present invention is not limited to this. The same functions may be downloaded in the apparatus from a network or a device that enables a recording medium to store the same functions may be installed in the apparatus. As long as the recording medium can store a program such as a CD-ROM and can be read by the apparatus, the form thereof is optional. Further, the functions installed or downloaded in advance in this way may be realized through the cooperation with an OS (Operating System) inside the apparatus.

Through the form of the embodiment, the user can grasp the status of the power saving mode more detailed, and it is possible to realize the improvement of use application and power-saving setting matching with the use application.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A display apparatus, comprising:
   a processor that executes instructions that facilitate performance of operations, comprising:
   switching a mode to each mode of a normal mode and a power saving mode that consumes less power than the normal mode;
   shifting an apparatus from the normal mode to the power saving mode in a case in which a shift period during which an operation or a job is not executed lasts a certain time;
   totaling times the apparatus enters the shift period, times the apparatus shifts to the power saving mode, times the apparatus returns to the normal mode, and dwell time when the apparatus is in the normal mode for each time zone;
   displaying each value totalized for each time zone;
   determining whether a current value is set to a recommended value or a new recommended value is presented based on a difference or a ratio between times the apparatus enters the shift period and times the apparatus shifts to the power saving mode;
   wherein the shift period comprises two stages comprising a first shift period and a second shift period, controlling a supply of power to make power supply during the first shift period smaller than or equal to that during job execution when the power supply is larger than when the power supply is in the power saving mode; and
   controlling the supply of power to make the power supply during the second shift period smaller than or equal to that during the first shift period when the power supply is larger than when the power supply is in the power saving mode.

2. The display apparatus according to claim 1, the operations further comprising;
   counting times the apparatus enters the shift period and times the apparatus shifts to the power saving mode; and
   acquiring times the apparatus enters the shift period and times the apparatus shifts to the power saving mode, acquiring time when the apparatus enters the shift period, time when the apparatus shifts to the power saving mode and time when the apparatus shifts to the normal mode and enabling a storage section to store these values; and
   according to the values stored in the storage section, acquiring times the apparatus enters the shift period, times the apparatus shifts to the power saving mode and dwell time in the normal mode are totalized for each time zone.

3. The display apparatus according to claim 1, the operations further comprising:
   displaying a current setting value of the shift period for each time zone.

4. The display apparatus according to claim 3, the operations further comprising:
   receiving a changed value of the shift time, wherein
   the displaying displays a predicted value of dwell time in the normal mode in a case in which the shift time is assumed as the changed value.

5. The display apparatus according to claim 4, the operations further comprising:
   controlling a power supply device to carry out shift of a mode at the changed shift time.

6. The display apparatus according to claim 3, the operations further comprising:
   displaying a recommended value of the shift time for each time zone.

7. The display apparatus according to claim 1, the operations further comprising:
   displaying times the apparatus enters the shift period and times the apparatus shifts to the power saving mode graphically.

8. The display apparatus according to claim 1, the operations further comprising:
   displaying a ratio of times the apparatus enters the shift period to times the apparatus shifts to the power saving mode.

9. A display method, including:
   switching a mode to each mode of a normal mode and a power saving mode that consumes less power than the normal mode;
   shifting an apparatus from the normal mode to the power saving mode in a case in which a shift period during which an operation or a job is not executed lasts a certain time;
   totalizing times the apparatus enters the shift period, times the apparatus shifts to the power saving mode, times the apparatus returns to the normal mode, and dwell time when the apparatus is in the normal mode for each time zone;

displaying each totalized value for each time zone;
determining whether a current value is set to a recommended value or a new recommended value is presented according to a difference or a ratio between times the apparatus enters the shift period and times the apparatus shifts to the power saving mode;
wherein the shift period comprises two stages comprising a first shift period and a second shift period, controlling a supply of power to make power supply during the first shift period smaller than or equal to that during job execution when the power supply is larger than when the power supply is in the power saving mode; and
controlling the supply of power to make the power supply during the second shift period smaller than or equal to that during the first shift period when the power supply is larger than when the power supply is in the power saving mode.

10. A non-transitory computer readable storage medium which stores a program to enable a computer to switch a mode to each mode of a normal mode and a power saving mode that consumes less power than the normal mode; shift an apparatus from the normal mode to the power saving mode in a case in which a shift period during which an operation or a job is not executed lasts a certain time; totalize times the apparatus enters the shift period, times the apparatus shifts to the power saving mode, and times the apparatus returns to the normal mode, and dwell time when the apparatus is in the normal mode for each time zone; display each totalized value for each time zone; and determine whether a current value is set to a recommended value or a new recommended value is presented according to a difference or a ratio between times the apparatus enters the shift period and times the apparatus shifts to the power saving mode;
wherein the shift period comprises two stages comprising a first shift period and a second shift period, controlling a supply of power to make power supply during the first shift period smaller than or equal to that during job execution when the power supply is larger than when the power supply is in the power saving mode; and
controlling the supply of power to make the power supply during the second shift period smaller than or equal to that during the first shift period when the power supply is larger than when the power supply is in the power saving mode.

* * * * *